United States Patent
Newman et al.

(10) Patent No.: US 7,162,581 B2
(45) Date of Patent: Jan. 9, 2007

(54) DEFERRED TUPLE SPACE PROGRAMMING OF EXPANSION MODULES

(75) Inventors: Thomas John Newman, Discovery Bay, CA (US); Leonard Ott, Livermore, CA (US); Robert John Miller, Fremont, CA (US); Bobby Dale Gifford, Hayward, CA (US); Larry Lovercheck, Palo Alto, CA (US)

(73) Assignee: Socket Communications, Inc., Newark, CA (US)

( * ) Notice: Subject to any disclaimer, the term of this patent is extended or adjusted under 35 U.S.C. 154(b) by 0 days.

(21) Appl. No.: 11/320,527

(22) Filed: Dec. 28, 2005

(65) Prior Publication Data

US 2006/0242355 A1 Oct. 26, 2006

Related U.S. Application Data

(60) Division of application No. 11/102,209, filed on Apr. 9, 2005, now Pat. No. 7,003,627, which is a continuation of application No. PCT/US03/29123, filed on Oct. 14, 2003.

(60) Provisional application No. 60/418,210, filed on Oct. 15, 2002.

(51) Int. Cl.
*G06F 13/10* (2006.01)
*G06F 12/02* (2006.01)

(52) U.S. Cl. .................. 711/115; 711/2; 710/8; 710/10; 710/13

(58) Field of Classification Search .......... 711/2, 711/115; 710/8, 10, 13
See application file for complete search history.

(56) References Cited

U.S. PATENT DOCUMENTS

| | | | |
|---|---|---|---|
| 5,375,222 A | 12/1994 | Robinson et al. | |
| 5,978,862 A | 11/1999 | Kou et al. | |
| 7,003,627 B1 | 2/2006 | Newman et al. | |

FOREIGN PATENT DOCUMENTS

JP 2000322533 11/2000

OTHER PUBLICATIONS

ISR for International Application No. PCT/US 03/29123; completed Feb. 17, 2004, mailed Apr. 3, 2004.
Oxford Semiconductor LTD.:"OXCF950 rev B, Data Sheet V1.0", Online!, Jul. 2002, Oxford Semiconductor.

*Primary Examiner*—Jack A. Lane
(74) *Attorney, Agent, or Firm*—Patent Ventures:; Bennett Smith; Korbin Van Dyke

(57) ABSTRACT

The present invention permits deferring the final provisioning of the Card Information Structure (CIS) in the attribute memory space of expansion cards (or modules) for portable hosts. This enables expansion cards to be distributed, sold, and installed by their end-users prior to the final provisioning, which is performed during their initial use. A temporary default CIS image is provided that permits baseline functionality of the expansion card with a host device. Providing the default CIS data enables provisional installation and operation of the card in the host, including accessing the card by way of default card services and socket software layers, as provided in the standard software environment of the host. The provisional operation enables higher level software to program the final CIS values in the peripheral controller internal CIS data-structure, EEPROM on the card, or any combination of the two.

24 Claims, 4 Drawing Sheets

DEFERRED TUPLE SPACE PROGRAMMING OF EXPANSION MODULES

CROSS REFERENCE TO RELATED APPLICATIONS

Priority benefit claims for this application are made in the accompanying Application Data Sheet. This application incorporates by reference for all purposes the following applications, which are all owned by the owner of the instant application:

U.S. application Ser. No. 11/102,209, filed Apr. 9, 2005, now U.S. Pat. No. 7,003,627, by Thomas Newman, et al., and entitled Deferred Tuple Space Programming of Expansion Modules;

PCT Application Serial No. PCT/US03/29123, filed Oct. 14, 2003, by Thomas Newman, et al., and entitled Deferred Tuple Space Programming of Expansion Modules; and U.S. Provisional Application Ser. No. 60/418,210, filed Oct. 15, 2002, by Thomas Newman, et al., and entitled Deferred Tuple Space Programming of Expansion Modules.

FIELD

This invention is related to removable expansion cards for computer hosts, such cards having particular application to portable computer hosts such as handheld computing devices, notebook-sized computing devices, and similar reduced form-factor computing platforms.

BACKGROUND

Portable computer hosts, including handheld computing devices, notebook-sized computing devices, and similar reduced form-factor computing platforms, typically allow for expansion capabilities via slots for plug-in expansion cards (also known as expansion modules). Users of these portable hosts are hindered from realizing the full capability of the portable host without expansion cards, and typically users purchase a multiplicity of cards to use in various hosts for multiple applications. Users are unable to use these expansion cards in a "plug and play" fashion unless the cards are compatible with the software drivers included on the particular portable host at the time of manufacture of the portable host. Alternatively, users may directly install new drivers or configuration software that in turn installs new drivers, when a new expansion card is installed in a host for the first time. This driver installation effort reduces the utility of new expansion cards.

Current manufacturers of expansion cards for portable hosts respond to this need by supplying "plug and play" cards compatible with the insertion detection and automatic driver installation and activation provided by the standard software environment of many of these portable hosts. After insertion of the card into the expansion slot the host will query the card. A portion of the "plug and play" compatibility requires the card to then provide the host with card configuration information in a standard format. The returned information is in the format of a complex data-structure describing the capabilities and protocol requirements of the expansion card. This configuration information is the same for all instances of a given version of a card, but will likely differ for different card versions, and is certainly distinct between card designs of differing capabilities. A memory-only expansion card, for example, returns configuration information to the host that is dramatically different from a combination memory and I/O expansion card.

Expansion card designs have typically relied on an integral serial EEPROM component to provide non-volatile storage for the configuration information data returned to the host. Heretofore, it has been necessary that the EEPROM be initialized with the proper data before the first use of the card by an end-user.

Expansion Card Standards

Two of the most popular industry standards for expansion cards and their associated expansion slots are the PC Card and the CompactFlash (CF) Card. The PC Card has a 16-bit variant, previously known as a PCMCIA card, and a newer 32-bit variant, also known as a Card-Bus card. U.S. Pat. No. 5,815,426 ('426), ADAPTER FOR INTERFACING AN INSERTABLE/REMOVABLE DIGITAL MEMORY APPARATUS TO A HOST DATA PART, assigned to Nexcom Technology, and hereby incorporated by reference, describes these and other removable expansion card and memory types suitable for portable hosts. In addition to the PC Card and CF Card formats, the '426 patent includes discussions of and references to Miniature Cards, Sold State Floppy Disk Cards (SSFDCs), MultiMediaCards (MMC), Integrated Circuit (IC) Cards (also known as Smart Cards), and Subscriber Identification Module (SIM) Cards.

The following additional references provide further information on the PC Card and CF Card standards.

CFA, CF+ and CompactFlash Specification, Revision 1.4, www.compactflash.org, CompactFlash Association, P.O. Box 51537, Palo Alto, Calif. 94303.

CFA, CF+ and CompactFlash Specification, Revision ATA Compatibility Working Group Draft 0.1, www.compactflash.org, CompactFlash Association, P.O. Box 51537, Palo Alto, Calif. 94303.

PCMCIA, PC Card Standard, March 1997, www.pccard.com, Personal Computer Memory Card International Association, 2635 North First Street, Suite 209, San Jose, Calif. 95134.

Design Guidelines for PC Card and CardBus, Addendum to PC 2001 System Design Guide, Version 1.1, Apr. 12, 2000, Intel Corporation and Microsoft Corporation.

Card Information Structure (CIS) Data Format

All PC Card and CF Card hardware interfaces to host application software via an intermediate two-layer interface: card services and socket services. The socket-services layer communicates directly with the expansion card socket-controller chips, and acts as an interface between this card socket-controller hardware and the card-services layer. The card-services layer manages the system resources the card requires, including determining IRQs and memory addresses allocated on the host for operation with the card. These software layers rely on obtaining information about the functions and characteristics of the expansion card by referencing a standard data-structure for card attributes, the Card Information Structure, or CIS. The CIS data describes the operations and capabilities of the card to the card and socket services software layers. The CIS data-structure is allocated to the lowest addresses in the standard expansion card attribute memory space.

The PC Card Standard defines a Card Metaformat that establishes CIS data-structure format rules. The standard CIS data-structure format is illustrated in FIG. 1A. The CIS is a collection of sets, called tuples, accessible in the attribute memory space of an expansion card. The CIS portion of the attribute memory is thus also known as the "tuple space." Each tuple has a variable number (i.e., an n-tuple) of attribute parameters that are related in some way. Except for the final tuple, each tuple begins with a one byte code, followed by a one byte length, and ending with a variable number of data bytes. The length byte describes the number of data bytes. The number of tuples varies from card to card, and the end of the list is indicated by a special "last tuple" (CISTPL_END) having the code FFh. Thus, encountering a tuple beginning with FFh indicates there are no further tuples to process. No length or data bytes are required for the CISTPL_END tuple.

As illustrated in FIG. 1A, CIS $Code_1$ (CD1) 105 is the code byte for CIS $Tuple_1$ (TPL1) 100, the first tuple in the CIS. The next byte, CIS $Length_1$ (LNG1) 106, is equal to the length of CIS $Data_1$ (DT1) 107. The CIS Data, 107 provides the detailed descriptive information associated with CIS $Code_1$ 105. Following CIS $Data_1$ 107 is CIS $Code_2$ (CD2) 108, the code for CIS $Tuple_2$ (TPL2) 101. The length byte for $Tuple_2$ 101 is not explicitly shown, but is understood to be present as previously described. Similarly, DT2 109 is the is the detailed descriptive information associated with CD2. The special tuple marking the end of the CIS is CIS $Tuple_N$ (TPLN) 103, with CIS $Code_N$ (CDN) 110. (Since this is the last tuple, CDN must necessarily have the value FFh as discussed above.) Other tuples (OTPLS) 102 may be intermediate between TPL2 AND TPLN.

A particular tuple of interest defined by the PC Card Standard is the Device-Information Tuple (CISTPL_DEVICE) having the code 01h. This tuple is used to describe various types of Common Memory space within a PC Card. Sub-components of the device-information tuple include a type flag, a write protection flag, a speed field, and a size field. One particular defined type of interest for the device-information tuple is a null device (DTYPE_NULL, 00h), corresponding to the situation when no device is present at a corresponding portion of the Common Memory address space. The smallest size value allowed is 00h, which allocates 1 block of 512 bytes. In accordance with techniques known to those skilled in the art, the device-information tuple may be used (in conjunction with other tuples) by host driver/services to generate a unique Plug and Play device ID for the PC Card.

Serial EEPROM and UART Standards

Serial EEPROMs using a standard "three-wire" interface are known in the art. A representative part is the 93CS46, described in the datasheet for the NM93CS06/CS46/CS56/CS66 device, August 1994, from National Semiconductor.

Universal Asynchronous Receiver/Transmitters (UARTs) are also known in the art. The 16C450/16C550 is a de-facto standard for PC compatible serial ports. A representative part is described in the datasheet for the PC16550D, June 1995, from National Semiconductor.

Limitations of Previous Approaches

Expansion cards for use in portable hosts have been limited to providing data-structure configuration information from a serial EEPROM on the expansion card. Furthermore, the tuple space of this EEPROM has heretofore been fully programmed before the card is first mated by an end-user with a host. The serial EEPROM device required on the card, and the prior tuple space programming of the EEPROM by the expansion card manufacturer or vendor, add to the complexity and cost of the expansion card. This approach is also inherently inflexible, as once the tuple space is programmed the card can only be used for purposes consistent with its programming. This requires programming cards according to the intended end-use application, limiting the cards commonality with respect to end-uses. The EEPROM must also be interfaced to the host, using resources that might otherwise be available for other functions. Programming the EEPROM's tuple space before the first use of the card also reduces the options in the manufacturing flow producing the card, since the programming must be completed before the card may be used with a host. What is needed is an improvement that reduces the complexity, cost, and inflexibility of the current approach of using an EEPROM with a fully pre-programmed tuple space to provide the initial CIS.

DISCLOSURE OF THE INVENTION

Introduction

This introduction is included only to facilitate the more rapid understanding of the Detailed Description. The invention is not limited to the concepts presented in the introduction, as the paragraphs of the introduction are necessarily an abridged view and are not meant to be an exhaustive or restrictive description. As is discussed in more detail in the Conclusions, the invention encompasses all possible modifications and variations within the scope of the issued claims, which are appended to the very end of the patent.

The present invention permits deferring the final provisioning of the Card Information Structure (CIS) in the attribute memory space of expansion cards (also known as expansion modules) for portable hosts. This enables expansion cards to be distributed, sold, and installed by their end-users prior to the final provisioning, which is performed during their initial use. A temporary default CIS image is provided that permits baseline functionality of the expansion card with a host device. The final CIS image is then dynamically selectively determined and written into the attribute memory.

The default CIS data is sourced by a memory internal to a peripheral controller included on the card. The peripheral controller provides the default CIS data when an EEPROM, also included on the card, is not pre-programmed. Providing the default CIS data enables provisional installation and operation of the card in the host, including accessing the card by way of default card services and socket software layers, as provided in the standard software environment of the host. The provisional operation enables higher level software to program the final CIS values in the peripheral controller internal CIS data-structure (in attribute memory), EEPROM on the card, or any combination of the two.

In an alternate embodiment, the peripheral controller provides the default CIS values when there is no EEPROM included on the card. Other embodiments also provide for further selection choices for the source data for peripheral controller internal CIS initialization. Choices between two sets may be allowed (EEPROM on the card, or peripheral controller internal default), or three sets (EEPROM on the card, peripheral controller internal default, or none). In an illustrative embodiment a register-level interface enables the host to program the EEPROM on the card. Other illustrative embodiments provide for peripheral controller internal configuration register initialization, in addition to peripheral controller internal CIS initialization.

The complexity and cost of expansion cards for hosts are reduced, and greater flexibility afforded, by these techniques for providing default CIS information for devices without a pre-programmed tuple space, according to the present invention. Providing default CIS information enables the design, manufacture, and operation of expansion cards compatible with the PC Card and CF Card standards, without requiring pre-programming of the EEPROM before the first use of the card by the end-user. Providing default CIS information also enables the design, manufacture, and operation of cards without an EEPROM component included on the card. These improvements provide for more economical and simpler expansion cards, and afford card designers greater flexibility than before. Omission of the EEPROM frees up expansion card space for other devices to provide greater functionality. Cards including an EEPROM may postpone programming the EEPROM until the first time the card is used, including a first use by an end-user, providing greater flexibility to expansion card manufacturers and vendors.

Several methods are taught for providing initial CIS data upon a first mating of an expansion card with a host. A first approach for providing the initial data includes determining if there is an external EEPROM. If a programmed EEPROM is present, its external tuples are used for the initial CIS data. Otherwise default internal tuples are used. A second approach also uses external tuples as in the manner of the first approach, if the external EEPROM is present and programmed. However, if no programmed external EEPROM is present, then an I/O-pin configuration determines whether internal tuples are used or whether no tuples are initialized.

Several illustrative embodiments are also taught for in-situ programming of an EEPROM coupled to a peripheral controller, wherein both the EEPROM and the peripheral controller are included on an expansion card compatible with a standard expansion card environment. A method for the in-situ programming includes providing an expansion card including the EEPROM and the peripheral controller, mating the expansion card with a compatible host, determining that the EEPROM is not programmed, initializing initial CIS data with internal default CIS data, executing an EEPROM programming application on the host, and interfacing the results of the execution of the programming application to the EEPROM, resulting in programming of the EEPROM. A system for the in-situ programming includes a compatible host and expansion card, the expansion card including an EEPROM and a peripheral controller, the peripheral controller including a programmed EEPROM detection mechanism, a default CIS image, a default CIS image to initial CIS image copying mechanism, and a host EEPROM programming register interface.

DETAILED DESCRIPTION

System Operation

Figure 2:
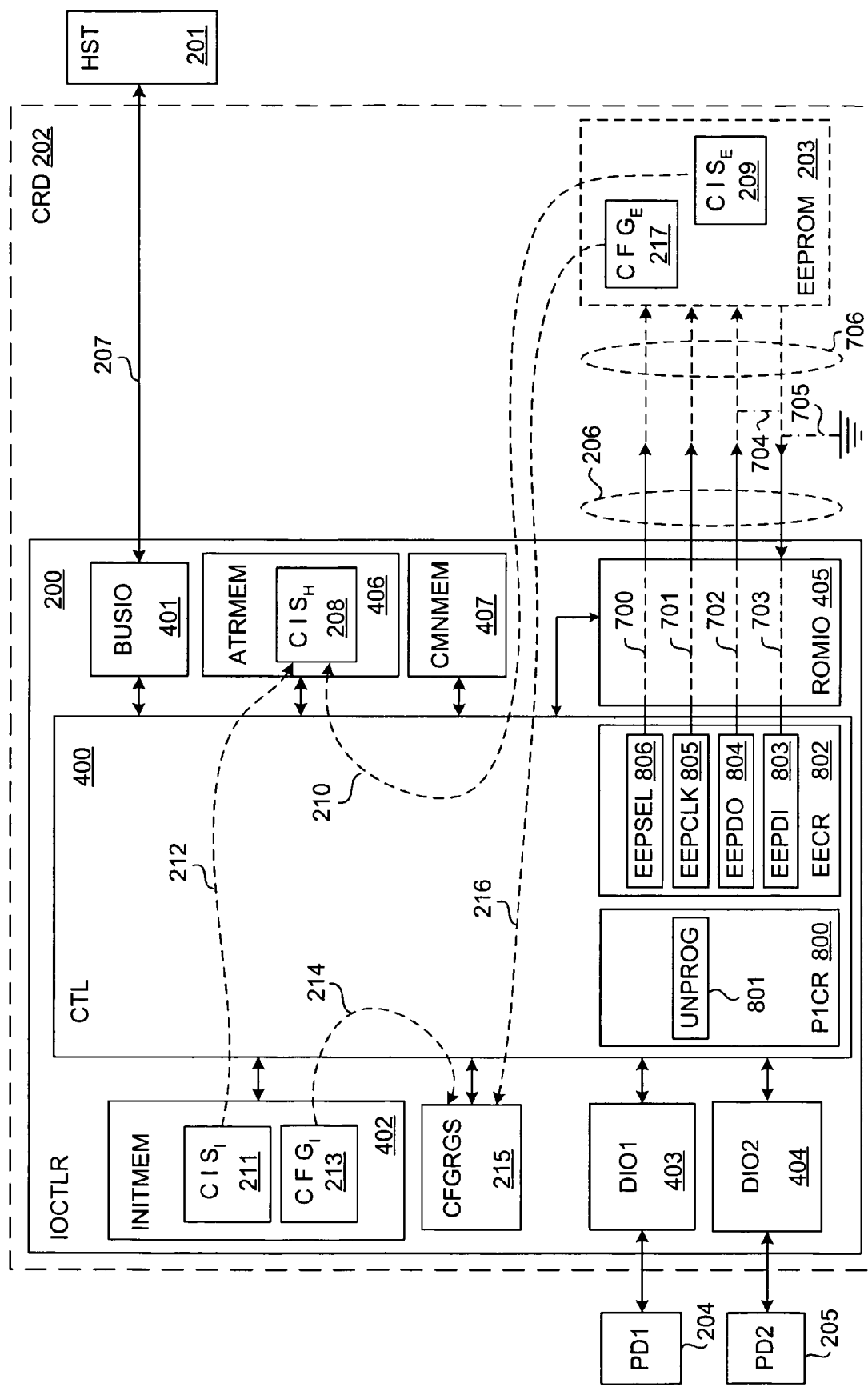
FIG. 2 is a block diagram showing a peripheral controller, a PC Card using the peripheral controller, and the system context in which the peripheral controller and PC Card interact, all in accordance with the present invention. Details are provided regarding optional couplings on the card for the serial EEPROM bus as well as the internal logic for providing host access to a serial EEPROM via the peripheral controller.

FIG. 2 is a block diagram of a system in accordance with the present invention. Expansion card host (HST) 201 may be any computing device with expansion card capability compatible with expansion card (CRD) 202, such as a PDA, pocket computer, notebook computer, or other portable host. Expansion card 202 enhances the functions otherwise available in host 201 by providing peripheral interface capabilities when mated with host 201. While expansion card 202 may be any form factor and protocol compatible with host 201 and host expansion card bus 207, in this illustrative embodiment it is a 32-bit PC Card.

Expansion card 202 includes at least peripheral controller (IOCTLR) 200 and optionally serial EEPROM 203, coupled via serial EEPROM bus 206 and optional interconnect 706. If serial EEPROM 203 and interconnect 706 are included, optional I/O-pin configurations 704 and 705 (discussed in detail below) are not used. Expansion card 202 typically also includes other well-known components (not shown) such as a crystal or oscillator, and peripheral transceiver devices.

Figure 1C:
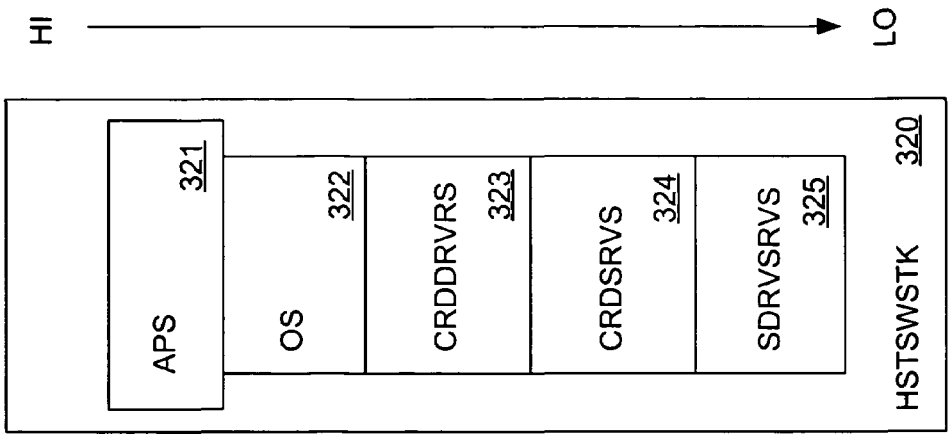
FIG. 1C illustrates a host software/firmware stack in accordance with the present invention.

Peripheral controller 200 serves as an interface between host 201 and one or more external peripherals, e.g., peripheral device$_1$ (PD1) 204 and peripheral device$_2$ (PD2) 205. In an illustrative embodiment, peripheral device$_1$ 204 and peripheral device$_2$ 205 are serial devices, and peripheral controller 200 provides UART functions for interfacing to them. Peripheral controller 200 includes $CIS_H$ image 208 (the "H" subscript signifying that this is the CIS observed by the host) to provide host 201 with a description of the functions and capabilities of expansion card 202, as required by the standards describing the interface embodied in host expansion card bus 207. The CIS image is structured in the form of tuples compatible with the interface standard as described by FIG. 1A, and accessible via attribute memory accesses.

Peripheral controller 200 also includes $CIS_I$ storage 211 (the "I" subscript signifying that this is the CIS image stored in the initialization memory of the peripheral controller) to serve as one of two possible sources of data for initialization of $CIS_H$ storage 208. The second possible source of initialization data for $CIS_H$ storage 208 is included in optional serial EEPROM 203, as $CIS_E$ image 209 (the "E" subscript signifying that this is the CIS image stored in a memory external to the peripheral controller). Similarly, peripheral controller 200 also includes configuration registers 215. These may be initialized from optional $CFG_I$ image 213 within peripheral controller 200, or from $CFG_E$ image 217, included in optional serial EEPROM 203. Initialization of both $CIS_H$ storage 208 and configuration registers 215 is further overviewed in the next several paragraphs and is discussed further below in conjunction with discussions of Initialize $CIS_H$ procedure 509 of FIGS. 3 and 4.

In the illustrated with-EEPROM embodiments, a "three-wire" serial EEPROM with at least 256 bytes of storage is used for serial EEPROM 203. One suitable serial EEPROM is the 93C56, available from a number of manufacturers, including National Semiconductor.

In a first illustrative embodiment that includes an EEPROM, expansion card 202 is mated with expansion card host 201, the card and host being coupled via host expansion card bus 207. This procedure also provides operating power and a reset event to expansion card 202. After mating and the subsequent reset event, peripheral controller 200 examines serial EEPROM 203 to determine if it is pre-programmed. If serial EEPROM 203 is pre-programmed, then in a first mode of operation, peripheral controller 200 initializes $CIS_H$ image 208 from $CIS_E$ image 209 as abstractly suggested by information transfer 210. However, if serial EEPROM 203 is not programmed, then in a second mode of operation, peripheral controller 200 initializes $CIS_H$ image 208 from $CIS_I$ image 211 as abstractly suggested by information transfer 212. From the time of the reset event, until the copying is complete, peripheral controller 200 stalls accesses from host 201. After the copying, host accesses to expansion card 202 are then allowed to proceed, and typically include references to $CIS_H$ image 208.

Serial EEPROM 203 is an illustrative embodiment of non-volatile storage external to peripheral controller 200. A mask or fuse programmed memory device or other non-volatile technology may be substituted in other embodiments.

In alternate embodiments of the present invention the optional serial EEPROM 203 does not exist. The operation in the no-EEPROM embodiments is similar to that described previously, when serial EEPROM 203 is not programmed, except that peripheral controller 200 determines that no serial EEPROM is present, and then initializes $CIS_H$ image 208 from $CIS_I$ image 211 as shown by information transfer 212.

An illustrative embodiment of expansion card 202 is a 32-bit PC Card, but those of ordinary skill in the art will recognize peripheral controller 200 may also be used on a 16-bit PC Card, a CF Card, or any other similar expansion card or module compatible with the protocol, electrical, and mechanical aspects of host expansion card bus 207. Further, the invention is not restricted to the physical configurations of a PC Card or CF Card and their associated host mating structures. Other mechanical techniques for mating the card to the host are possible, including surrounded insertion, open-back insertion, and insertion into a sleeve or similar adapter for augmenting the expansion capabilities of the host.

Although peripheral controller 200 is described in the illustrative embodiment as providing UART capabilities for interfacing to serial peripheral devices, those of ordinary skill in the art will recognize how to use the invention in peripheral controllers having other functions, such as a universal serial bus (USB) interface, a parallel port interface, a network adapter, a bar-code scanner or other data acquisition device interface, or an interface to any other computing peripheral device. These functions may also be included on other embodiments of expansion card 202, or multifunction cards combining one or more of these or other capabilities. Thus, any expansion card requiring CIS data initialization, or equivalent standardized configuration data initialization, may be adapted to exploit the benefits of the present invention.

As mentioned previously, peripheral controller 200 includes configuration registers 215, to provide mode and other control information for specifying the operation of peripheral controller 200. Also illustrated in FIG. 2, an alternate embodiment of the present invention includes $CFG_I$ image 213 for optional initialization of configuration registers 215. In a first alternate with-EEPROM embodiment, in the first mode of operation (corresponding in part to the first mode described previously), after $CIS_E$ storage 209 is copied into $CIS_H$ storage 208, $CFG_E$ image 217 is copied into configuration registers 215 (as abstractly suggested by information transfer 216). In the second mode of operation (corresponding in part to the second mode described previously), $CIS_I$ storage 211 is first copied into $CIS_H$ storage 208, and then image 213 is also copied into configuration registers 215 (as abstractly suggested by information transfer 214). The order of copying is arbitrary, and in a second alternate embodiment, configuration registers 215 are copied into before $CIS_H$ storage 208. In this manner, configuration registers 215 may be initialized in conjunction with $CIS_H$ storage 208 to provide default operation upon mating of expansion card 202 with expansion card host 201.

Host

Figure 1B:
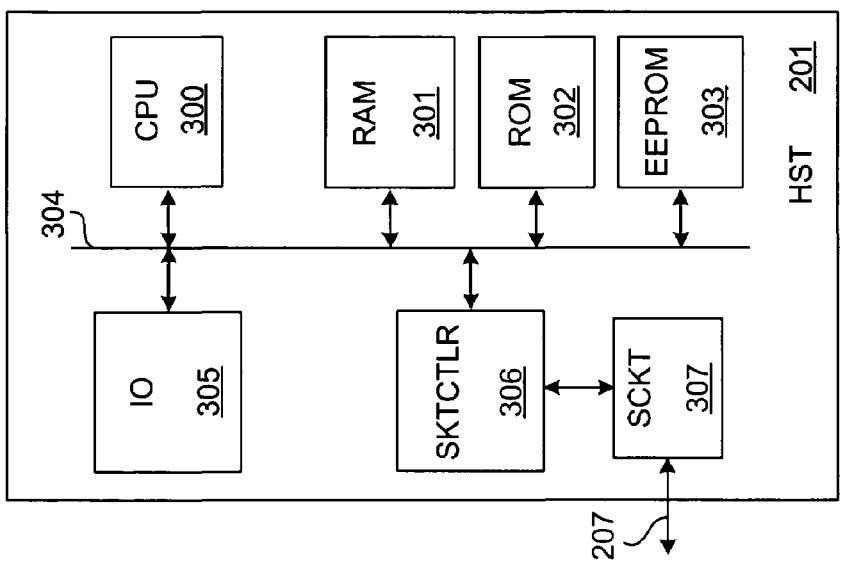
FIG. 1B is a block diagram of a host in accordance with the present invention.
Figure 1A:
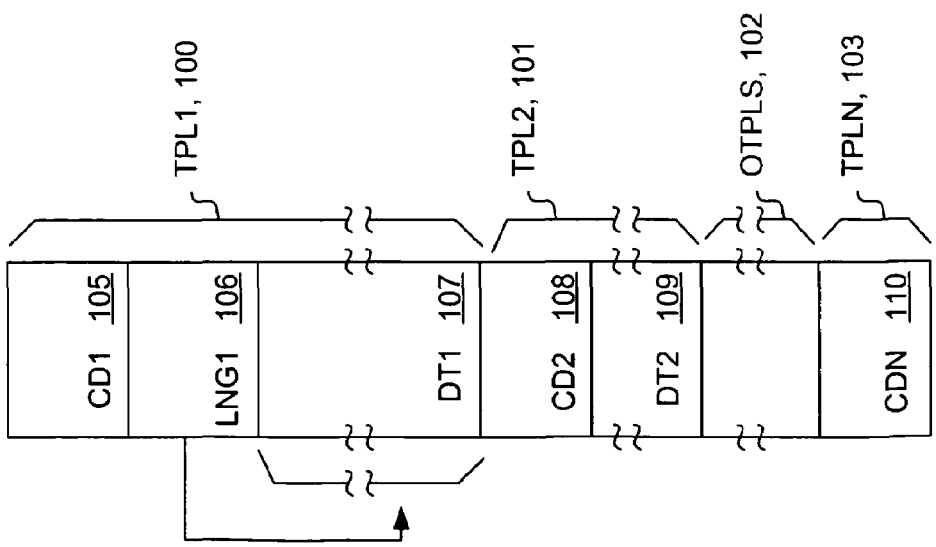
FIG. 1A illustrates the standard CIS data-structure format.

FIG. 1B is a block diagram of a host device in accordance with the present invention. Host (HST) 201, as previously described, may be any of a number of portable computing devices compatible with host expansion card bus 207 and mated expansion card CRD 202 (shown previously in FIG. 2). No alterations or modifications are required to the host to enable operation with expansion card 202, as long as the host provides a compatible expansion card bus, e.g. expansion card bus 207. FIG. 1B is illustrative of a particular embodiment of a compatible host, and not restrictive in any way. Host 201 includes host processor (CPU) 300, coupled to host RAM 301, host ROM 302, host EEPROM 303, other host peripherals (10) 305, and host socket controller (SKTCTLR) 306 via host internal bus 304. Host expansion card socket (SCKT) 307 is coupled to host socket controller 306 to provide a physical interface for an expansion card. Host processor 300 executes program instructions forming software and firmware including applications, operating systems, service functions, and driver layer codes. Host RAM 301 provides read/write storage for execution of these instructions. Host ROM 302 and host EEPROM 303 provide non-volatile storage for instructions and other read-only (302) and read-mostly (303) information pertinent to the applications host 201 makes available to a user. Other host peripherals block 305 includes items such as display, input, and other user-interaction related devices.

FIG. 1C illustrates a host software/firmware stack in accordance with the present invention. Host software/firmware stack (HSTSWSTK) 320 includes several layers relevant to expansion card operation. At the highest level is host application (APS) 321. At increasingly lower levels of abstraction are host operating system (OS) 322, host card specific driver layer (CRDDRVRS) 323, host card services layer (CRDSRVS) 324, and host socket driver/services layer (SDRVSRVS) 325. Other software components, not related to expansion card operation, are omitted for clarity. Host application 321 typically provides immediate interaction with a user while performing operations directly visible to, and under the direct control of, the user. Host application 321 relies on host operating system 322 to provide underlying functions, often shared between various applications. Host card specific driver layer 323 supplies functions unique to a particular expansion card design or configuration. Expansion cards providing generic functions, or functions that have been standardized over time, may not require host card specific driver layer 323. All expansion cards, however, require the lowest two layers, host card services layer 324 and host socket driver/services layer 325. Host card services layer 324 manages system resources required by the card, including interrupt vectoring and host memory space allocation for operation with the expansion card. Host socket driver/services layer 325, the lowest layer, communicates directly with mated expansion card 202 via host socket controller 306.

In an illustrative embodiment, host operating system 322 is a Win32 based operating system (such as WinNT, Win2000, or WinXP), but other operating systems are equally applicable, including Win16 (such as Win95 or Win98), Linux, and PalmOS, or an other similar host operating system. Host card services layer 324 and host socket driver/services layer 325 are Win32 compatible standard layers. However, host application 321, and host card specific driver layer 323, are specially adapted to provide for boot-strap programming (or re-programming) of $CIS_H$ storage 208 or serial EEPROM 203, as described below.

In other embodiments of the invention, where boot-strap programming is not required, host card specific driver layer 323 may not be present, and host application 321 is any application using the peripheral port expansion capabilities of expansion card 202. Illustrative embodiments of this type of host application 321 include file transfer utilities, internet browsers, or any other applications using peripheral port transfer capabilities.

Those of ordinary skill in the art will recognize that in some embodiments of host software/firmware 320, host card services layer 324 and host socket driver/services layer 325 may be bundled or closely associated with host operating system 322, but host card specific driver layer 323 is typically associated with a particular expansion card design or expansion card vendor. In addition, expansion cards of other capabilities (a USB interface, a parallel port interface, a network adapter, a bar-code scanner or other data acquisition device interface, or an interface to any other computing peripheral device), will correspondingly have other associated host applications.

Peripheral Controller

Peripheral controller (IOCTLR) 200 of FIG. 2 provides an interface between host (HST) 201 and one or more external peripherals: peripheral device$_1$ (PD1) 204, and peripheral device$_2$ (PD2) 205. Peripheral controller 200 includes control logic (CTL) 400 coupled to several other blocks: expansion card bus interface (BUSIO) 401, initialization memory (INITMEM) 402, device interface$_1$ (DIO1) 403, device interface$_2$ (DIO2) 404, configuration registers (CFGRGS) 215, serial EEPROM interface (ROMIO) 405, expansion card attribute memory block (ATRMEM) 406, and expansion card common memory block (CMNMEM) 407.

Expansion card bus interface 401 interfaces peripheral controller 200 to host expansion card bus 207, providing low-level logic and protocol functions needed to communicate via the standard external bus. Initialization memory 402 is non-volatile storage, and includes $CIS_I$ image 211, $CFG_1$ image 213, and associated access circuitry for coupling $CIS_I$ image 211 and $CFG_1$ image 213 to control logic 400. In an illustrative embodiment, device interface$_1$ 403 and device interface$_2$ 404 provide serial-to-parallel and parallel-to-serial UART functions in a standard manner, adhering to register and command structures defined by the 16C550 industry standard UART. Configuration registers 215 provide mode and control information specifying the operation of control logic 400. Serial EEPROM interface 405 provides an interface to serial EEPROM bus 206, a standard "three-wire" serial EEPROM communication channel. Expansion card attribute memory block 406 is volatile read-write storage and includes $CIS_H$ image 208 and associated access circuitry for coupling $CIS_H$ image 208 to control logic 400. Expansion card attribute memory block 406 further includes additional memory for storing data-structures not shown in the figure. Expansion card common memory block 407 is a volatile read-write memory and associated access circuitry for coupling to control logic 400. Expansion card attribute memory block 406 and expansion card common memory block 407 are available for processing functions performed by control logic 400, and are typically available for access by host 201 via expansion card bus interface 401 and control logic 400.

The operation of peripheral controller 200 is as follows. Peripheral controller 200 is a slave compatible with host expansion card bus 207. Expansion card bus interface 401 receives bus requests (reset, read, write, and so forth) via host expansion card bus 207 and passes these requests to control logic 400. Control logic 400 decodes each request, processing the request directly when it refers to a resource within control logic 400, and otherwise referencing device interface$_1$ 403, device interface$_2$ 404, configuration registers 215, serial EEPROM interface 405, expansion card attribute memory block 406, or expansion card common memory block 407 as appropriate. In this illustrative embodiment, device interface$_1$ 403 and device interface$_2$ 404 independently and in parallel perform serial-to-parallel and parallel-to-serial UART functions in accordance with the de-facto 16C550 standard. During this processing, device interface$_1$ 403 and device interface$_2$ 404 may generate an interrupt request. This is passed by control logic 400 to expansion card bus interface 401 for communication to host 201 via host expansion card bus 207.

Serial EEPROM interface 405 is a slave to control logic 400, and operates in two modes: pass-through mode (for direct host access of the EEPROM), and transaction mode (for access of the EEPROM in response to requests from control logic 400). In pass-through mode, serial EEPROM interface 405 effectively couples serial EEPROM bus 206 to the host via a register-level interface (this is described in more detail below). In transaction mode, serial EEPROM interface 405 transforms the requests from control logic 400 into the serial protocol appropriate to serial EEPROM bus 206. These requests may originate, for example, during $CIS_H$ image 208 initialization.

Expansion card attribute memory block 406 is a slave to control logic 400, responding to memory reference requests from control logic 400, reading or writing data at a requested address in accordance with the request. The first 512 locations of expansion card attribute memory block 406 are allocated to $CIS_H$ image 208, and are visible to host 201 in accordance with the standards associated with host expansion card bus 207. Expansion card attribute memory 406 locations are byte wide, and references to odd bytes alias to the next lower even address. Expansion card common memory block 407 is a slave to control logic 400, responding to memory reference requests from control logic 400, reading or writing data at a requested address in accordance with the request. Requests to expansion card attribute memory block 406 and expansion card common memory block 407 may originate entirely within control logic 400, or be in response to requests originating from host 201.

Control logic 400 coordinates the overall global activities of peripheral controller 200, referencing configuration registers 215 as appropriate to determine the mode of operation. These activities including reset and initialization, interrupt synchronization, and other related cooperative activities. Control logic 400 may be implemented with hardwired control structures, including multiple inter-communicating state machines or other logic blocks, or a more firmware-oriented microcontroller-style centralized-control scheme, or any combination of these. Furthermore, those of ordinary skill in the art will recognize that some of the functions in control logic 400 may share logic with functions shown in expansion card bus interface 401, initialization memory 402, device interface$_1$ 403, device interface$_2$ 404, configuration registers 215, serial EEPROM interface 405, expansion card attribute memory block 406, and expansion card common memory block 407. In addition, expansion card attribute memory block 406 and expansion card common memory block 407 may share one or more storage arrays, access logic, or other hardware. The partitioning indicated for the peripheral controller 200 of FIG. 2 is only an illustrative organization and is not limiting with respect to the scope of the present invention.

Initialization memory 402 is flash memory in an illustrative embodiment, but other memory technologies such as fuse programmable, mask programmable, or other types of non-volatile memory may form alternate embodiments. The choice of internal memory technology is driven by several factors, include non-recurring engineering costs, manufacturing costs, and expected production volumes.

CIS Initialization and Re-Programming

Following expansion card mating with a host, a standardized sequence of actions occurs, resulting in successful coupling of the card to the host hardware and software. This sequence must conform to the standards associated with the host expansion card bus to properly couple the host and expansion card, as described by the corresponding PC Card or CF Card standard. This renders the functions and capabilities of the card available to the operating system and applications executing on the host. As described in more detail below, one procedure during the coupling of the card includes initializing a CIS image in the attribute memory block of the expansion card. This attribute memory CIS image is addressable, according to the PC Card standard, in the attribute memory address space of the card, and is required to indicate to the host the functionality and characteristics of the expansion card. This CIS image conforms to the format illustrated in FIG. 1A, but those of ordinary skill in the art will recognize that the contents and specific use of the information in the data structure is new and unique to the present invention.

According to the present invention, the attribute memory CIS image first made available to the host after the expansion card coupling may later be modified by the host. The initial attribute memory CIS image provided by the card for the host indicates the minimum card functionality required to establish communication with the standard host card services and socket layers of software. In a first embodiment of the invention, subsequent to successful coupling, an installation program (a specialized application program), using the card services and socket layers via operating system calls, re-programs the initial attribute memory CIS image to further provision the functions and capabilities of the expansion card. In a second embodiment of the invention, instead of programming the directly accessible attribute memory CIS image, the host programs a CIS image in the external EEPROM. The host either programs the EEPROM for the first time or it modifies previously programmed values. This programmed EEPROM CIS image is then typically used during subsequent card mating events to initialize the attribute memory CIS image. In a third embodiment of the invention, the host programs (or re-programs) any portion of the external EEPROM contents. This programming may include modifying a portion of the EEPROM CIS image.

Figure 3:
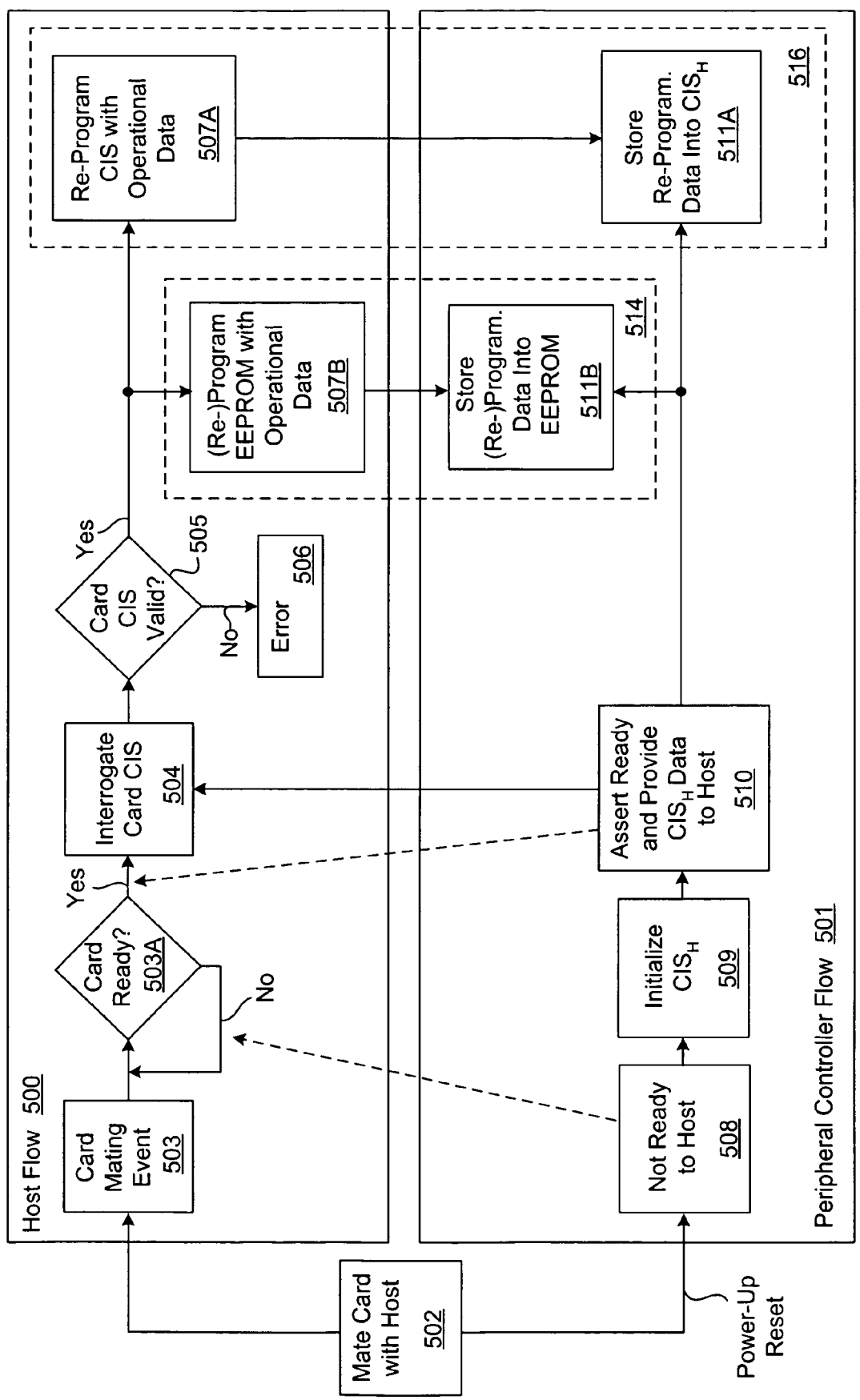
FIG. 3 is a flow diagram illustrating host and peripheral controller operations after an expansion card incorporating the peripheral controller is mated with the host, and the host subsequently re-programs either the CIS image in the peripheral controller, or the external EEPROM image via the peripheral controller, in accordance with the present invention.

FIG. 3 is a flow diagram illustrating host and peripheral controller operations after an expansion card incorporating the peripheral controller is mated with the host. Mating of expansion card 202 into host 201 is illustrated by procedure 502. This event initiates two parallel flows, one in the host, host flow 500, and one in the peripheral controller on the mated expansion card, peripheral controller flow 501.

Two distinct programming tasks (514 and 516) with common pre-cursor operations are illustrated in FIG. 3. Task 516 is the re-programming of the $CIS_H$ image in the peripheral controller. This is shown by way of procedures 507A in the Host Flow 500 and corresponding procedure 511A in the peripheral controller flow 501. Task 514 is the programming or reprogramming of the EEPROM by the peripheral controller. This is shown by way of procedures 507B in the Host Flow 500 and corresponding procedure 511B in the peripheral controller flow 501.

The first procedure in host flow 500 is event 503, where host 201 receives an indication that an expansion card has been mated with the host. This event originates in host socket controller 306 and is passed along to host socket driver/services layer 325 and then to host card services layer 324. In the meantime, expansion card 202 stalls the host at procedure 508, as soon as the card is powered-up and capable of processing. This "not ready" indication to the host persists until after Initialize $CIS_H$ procedure 509.

In procedure 509, control logic 400 initializes at least part of attribute memory block 406, including at least part of the $CIS_H$ image. In a first variation of procedure 509, corresponding to a common scenario in which no programmed EEPROM is detected, expansion card 202 copies $CIS_I$ image 211 into $CIS_H$ image 208, and $CFG_1$ image 213 into configuration registers 215. A total of 512 bytes are copied into $CIS_H$. The first 496 bytes comprise $CIS_I$ image 211, and the final 16 bytes comprise $CFG_1$ image 213.

Procedure 509 has other variations, which are selected from as a function of both the EEPROM status and the configuration of pins related to serial EEPROM interface 405. The specifics of these variations and how a given variation is selected are described below in conjunction with the detailed discussion of FIG. 4.

The host remains in procedure 503A until the card removes the "not ready" indication to the host. At procedure 510 the card is ready to provide valid CIS data to the host, and indicates this by removing the "not ready" indication. Subsequent to removing the "not ready" indication, host 201 is free to continue to procedure 504, while expansion card 202 awaits further requests from host 201.

In procedure 504 the host interrogates the card CIS data by way of routines in host card services layer 324 and host socket driver/services layer 325. These requests are of the form of reads from standard locations in expansion card attribute memory block 406, corresponding to the standard locations of CIS data. As illustrated in peripheral controller flow 501, in procedure 510, the card responds to the host requests for CIS data with data from $CIS_H$ image 208.

The host then proceeds to procedure 505, where it examines the returned CIS data to determine validity. If the returned data is not valid CIS data, then an error condition exists, as illustrated in procedure 506. However, if the CIS data is valid, then the host proceeds to either 507A or 507B, depending on which programming task (514 or 516) is to be performed.

To perform the re-programming of the $CIS_H$ image in the peripheral controller (task 516), the host flow proceeds to procedure 507A. There the host re-programs $CIS_H$ image 208 with modified operational data. There may be significant processing required in procedure 507A, including additional references to expansion card 202, in order to determine the specific modifications (if any) to make to $CIS_H$ image 208. This processing may vary according to the initial CIS values, specific card capabilities, and host operating environment. This procedure is typically executed by software included in portions of host card specific driver layer 323 and host application 321. There may be multiple techniques used at the host application layer, including an application specialized for expansion card factory use, an application tailored toward OEM use, and an application adapted for end-user use. Each of these would correspond to alternate embodiments of host application 321. Those of ordinary skill in the art will understand how to determine what processing to perform and what modifications to make to $CIS_H$ image 208 image data, depending on the requirements of the particular application.

The host communicates the new CIS data to peripheral controller 200 via writes to one or more locations within the standard CIS address space of expansion card attribute memory block 406. These writes are processed by control logic 400 in conjunction with expansion card attribute memory block 406. This is illustrated in peripheral controller flow 501, at procedure 511A, where the new data is stored into $CIS_H$ image 208.

The host and peripheral controller flows are synchronized by the ready indication from the peripheral controller to the host (procedures 508, 510, and 503A). In addition, the card design and characteristics of the delivery of card mating event 503 guarantee that the "not ready" indication is provided to the host before the host arrives at procedure 503A. Thus it is not possible for the host to receive CIS data until the card has completed the CIS initialization at procedure 509. Depending on timing characteristics of the host and peripheral controller, the host may not wait at all at procedure 503A (as the ready indication from the card might be achievable prior to the host reaching 503A), or the host may stall a short time or a very long time. These different timings are of no consequence with respect to the present invention.

The programming or re-programming of the EEPROM image via the peripheral controller (task 514), is nearly the same as that described above for re-programming the CIS image. The two differences are that procedure 507A is replaced by the host programming serial EEPROM 203 instead of $CIS_H$ image 208 as illustrated by procedure 507B, and procedure 511A is replaced by the peripheral controller in turn storing the programmed data into serial EEPROM 203. The programming of procedure 507B, like procedure 507A, may require significant processing to determine the required operational data for the EEPROM, and may be similarly adapted at the application layer for manufacturing, OEM and end-user contexts. The register-level details of the EEPROM programming interface between the host and the peripheral controller connected to serial EEPROM 203 are described in more detail below.

CIS Initialization and Embodiments

Multiple embodiments for initialization of $CIS_H$ image 208 and configuration registers 215 by peripheral controller 200 are possible. However, in all cases the resultant $CIS_H$ image must conform to the aforementioned PC and CF Card standards. The multiple embodiments are illustrated in the flowchart of FIG. 4, in accordance with the present invention.

Figure 4:
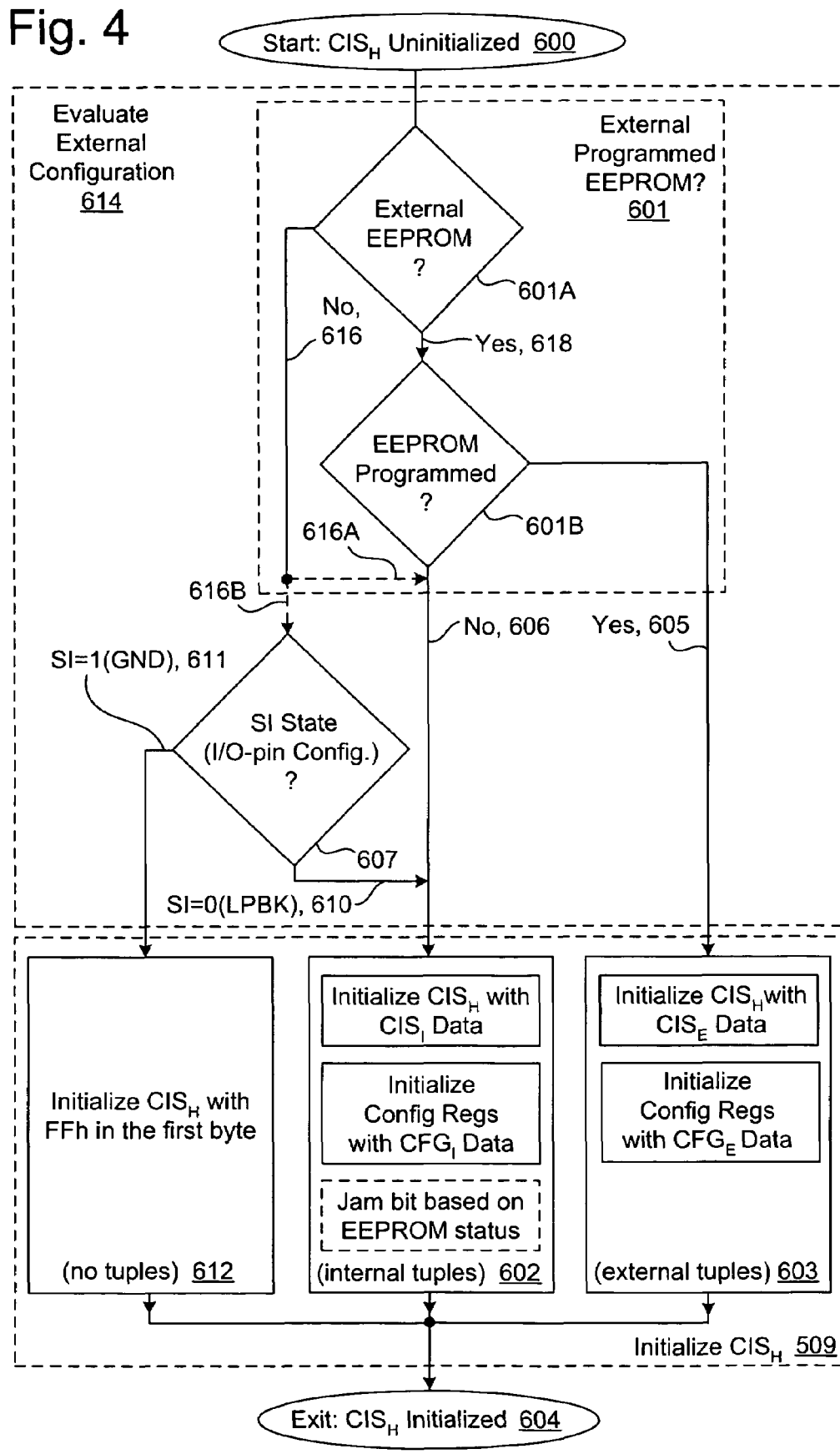
FIG. 4 is a flowchart illustrating methods of initializing a peripheral controller expansion card CIS image, in accordance with the present invention.

Conceptually, the procedures of FIG. 4 have been grouped into an Evaluate External Configuration 614 procedure and an Initialize $CIS_H$ 509 procedure. Evaluate External Configuration 614 consists of procedures 601A, 601B, and 607, which determine important aspects of the external EEPROM status and the I/O-pin configuration, the latter only being meaningful if there is no EEPROM. Procedures 601A (having No, 616 and Yes, 618 output paths) and 601B (having No, 606 and Yes, 605 output paths) collectively comprise procedure 601.

Procedures 612, 602, and 603 collectively comprise Initialize $CIS_H$ procedure 509, the same procedure 509 shown in FIG. 3. For a given set of circumstances, the initialization of the $CIS_H$ image is performed in only one of procedures 612, 602, or 603, each described below. These procedures correspond to the initialization of the $CIS_H$ image with no tuples (612), internal tuples (602), or external tuples (603). The particular one of these $CIS_H$ initialization procedures used is determined by procedure 614.

The procedures illustrated in FIG. 4 are performed under the direction of control logic 400, using resources in peripheral controller 200 as required, including configuration registers 215, initialization memory 402, expansion card attribute memory block 406, and serial EEPROM interface 405. Procedures 601 and 607 are an abstraction for the evaluation by peripheral controller 200 of the status of the external EEPROM and the chosen I/O-pin configuration (GND or LPBK, if any) of serial EEPROM interface 405. Low-level detail of how the evaluations of procedures 601 and 607 are accomplished is provided below in the section entitled "Not Programmed EEPROM and Secondary Indicator Evaluation."

A first initialization embodiment makes use of path 616A, but not path 616B. The first initialization embodiment uses a programmed external EEPROM as the data source for the initial CIS data and configuration register values, if the external EEPROM is present and programmed. (I.e., when a programmed EEPROM is present, the $CIS_H$ tuples are initialized from the external tuples in $CIS_E$.) Otherwise an internal memory image is used as the data source, both for the initial CIS data and optionally for the configuration register values. (I.e., otherwise the $CIS_H$ tuples are initialized from the default internal tuples in $CIS_I$.)

A second initialization embodiment makes use of path 616B but not path 616A. The second initialization embodiment also uses external tuples as in the manner of the first embodiment, if the external EEPROM is present and programmed. However, if no programmed external EEPROM is present, then an I/O-pin configuration determines whether the configuration registers and the $CIS_H$ tuples are initialized using the default values from the initialization memory or whether the configuration registers are not initialized and the $CIS_H$ is initialized to have no tuples.

Referring to FIG. 4, start 600 is the beginning of the initialization process for both embodiments. At this stage $CIS_H$ is not yet initialized. In procedure 601 peripheral controller 200 determines if serial EEPROM 203 is present, and if so, if it is programmed. The specifics of how this is done are described in more detail below. If the EEPROM is present and programmed, then processing continues along path 605 to procedure 603, where $CIS_H$ is programmed using the external tuples provided by $CIS_E$ (i.e., $CIS_E$ image 209 is copied into $CIS_H$ image 208), and $CFG_E$ image 217 is copied into configuration registers 215. However, if at procedure 601 it is determined that either serial EEPROM 203 is not present, or it is present but not programmed, then processing proceeds along either path 616A or 616B, depending on the embodiment.

In the first initialization embodiment (having path 616A, but not path 616B) if procedure 601 determines that no programmed EEPROM is present, processing proceeds along path 606 directly to procedure 602, where $CIS_H$ is programmed using the internal tuples provided by $CIS_I$ (i.e., $CIS_I$ image 211 is copied into $CIS_H$ image 208), and optionally $CFG_1$ image 213 is copied into configuration registers 215. After completing either procedure 602 or 603, as appropriate, the $CIS_H$ initialization process is complete, as indicated by exit 604.

The second initialization embodiment (having path 616B, but not path 616A) also uses external tuples as in the manner of the first embodiment (i.e., a programmed external EEPROM serves as the data source for the initial CIS data and configuration register values), if the external EEPROM is present and programmed. However, if procedure 601 determines that no programmed external EEPROM is present, processing proceeds along path 616B to procedure 607.

At procedure 607, evaluation of an external I/O-pin configuration (corresponding in the abstract to the state of a secondary indicator, SI) determines whether path 610 is followed to procedure 602 such that an internal memory image is used as the data source (i.e., whether internal tuples are used as described previously for the first initialization embodiment) or whether path 611 is followed such that there is no initialization of the configuration register values (i.e., configuration registers 215 are left unmodified) and $CIS_H$ is initialized to have no tuples (the first byte is loaded with the CISTPL_END code FFh). It is described below how the I/O-pin configuration (and the corresponding SI) may be deduced from the observed waveform behavior of an input pin. After completing either procedure 612, 602, or 603, as appropriate, the $CIS_H$ initialization process is complete, as indicated by exit 604.

Defining the CIS Initialization Values

The tuples and other contents stored in the $CIS_I$ storage 211 are selectively specified by using a commercially available macro assembler in a manner that is compatible with the March 1997 PC Card Standard Release 6.0. Those skilled in the art will recognize that other techniques for defining the CIS contents are possible and compatibility to other standards may be chosen. Consider by way of example that the first tuple in $CIS_I$ storage 211 is located at location 0000H, and consists of a device-information tuple (CISTPL_DEVICE) of minimum size: a one byte code having the value 01H (the data code representing a Device-Information Tuple); a one byte length having the value 03H (a link to the following tuple); a first Device Information Byte having the value OOH (corresponding to DTYPE_NULL, a null device); a second Device Information Byte having the value OOH (corresponding to 1 block of 512 bytes, the smallest memory window size allowed); and an end-of-tuple marker byte having the value FFH.

In an illustrative embodiment, the Plug and Play ID (PNP ID) generated by the host from tuples stored into $CIS_H$ image 208 is a function of the presence and prior programming of the external EEPROM. As mentioned previously, host driver/services may generate the Plug and Play device ID for the PC Card as a function of the value of the Device-Information Tuple. In accordance with such an approach to device ID generation, any difference in the value of the Device-Information Tuple will result in a different Plug and Play device ID being generated. This is exploited as follows. The behavior of the peripheral controller is such that the Device-Information Tuple read by the host differs in accordance with the external EEPROM status. The resulting Plug and Play device ID generated by the host socket driver/services layer 325 is thus a proxy for communicating the external EEPROM status. By communicating at such a high level of abstraction, far removed from either the internal microarchitecture of the peripheral controller or how the peripheral controller ascertains the EEPROM status, the host socket driver/services routines for determining the external EEPROM status can be greatly simplified. The external EEPROM status may in turn be communicated to higher layers of the software/firmware stack as required.

The Device-Information Tuple is determined as follows. When it is detected that an inserted card has a programmed external EEPROM, procedure 603 of FIG. 4 is performed as described previously (i.e., $CIS_E$ image 209 is copied into $CIS_H$ image 208). When an inserted card has a missing or unprogrammed EEPROM, procedure 602 of FIG. 4 is performed as described previously, except one bit of data in the Device-Information Tuple is modified (as a function of the EEPROM status) during the copying of $CIS_I$ image 211 into $CIS_H$ image 208. This technique may be optionally used in either of the first or second initialization embodiments discussed above. This is indicated in FIG. 4 by the dashed-line "Jam bit based on EEPROM status" box within procedure 602.

In a first ID-modification variation, if an inserted card has a missing or blank (unprogrammed) EEPROM, bit zero of the second Device Information Byte is forced (jammed) to a logic one in $CIS_H$ image 208 during the copying of the $CIS_I$ image 211 into $CIS_H$ image 208. In this way, the status of the EEPROM as missing or unprogrammed is communicated to the host.

In a second ID-modification variation, if a blank EEPROM is detected (an EEPROM that is present, but unprogrammed), bit zero of the second Device Information Byte is forced (jammed) to a logic one in the $CIS_H$ image 208. Otherwise, $CIS_I$ image 211 is copied into $CIS_H$ image 208 without alteration (leaving a logic zero in bit zero of the second Device Information Byte). It follows from the foregoing that the value for the Device-Information Tuple read by the host from $CIS_H$ differs for each of the following external EEPROM scenarios: programmed EEPROM (the value being that of the $CIS_E$ image), missing EEPROM (the value being that of the default $CIS_I$ image 211), and blank EEPROM (the value being a one-bit modified derivative of $CIS_I$ image 211).

Not Programmed EEPROM and Secondary Indicator Evaluation

As indicated previously, peripheral controller 200 may be used on a card with or without an external EEPROM. The various optional couplings (I/O-pin configurations) on the card of serial EEPROM bus 206 will now be discussed.

In a with-EEPROM configuration, peripheral controller 200 is coupled to serial EEPROM 203 via serial EEPROM bus 206 bits EEPSEL signal 700, EEPCLK signal 701, EEPDO signal 702, and EEPDI signal 703. These correspond to the chip select, clock, data input, and data output, respectively, of serial EEPROM 203. In this with-EEPROM configuration, peripheral controller 200 has full access to serial EEPROM 203 for reading, programming, and erasing. The EEPROM may or may not be programmed.

In a first no-EEPROM configuration, optional interconnect 706 (representing the extension of serial EEPROM bus 206 to the optional EEPROM) does not exist. Instead, EEPSEL signal 700 and EEPCLK signal 701 are left floating, while EEPDO signal 702 is coupled to EEPDI signal 703 via loop-back (LPBK) coupling 704. This first no-EEPROM configuration corresponds to a first secondary indicator state (SI=0; LPBK; and path 610 of FIG. 4), as contrasted with the next configuration.

In a second no-EEPROM configuration, EEPSEL signal 700, EEPCLK signal 701, and EEPDO signal 702 are left floating, while EEPDI signal 703 is coupled to ground via coupling 705. This second no-EEPROM configuration corresponds to a second secondary indicator state (SI=1; GND; and path 611 of FIG. 4), as contrasted with the previous configuration.

Thus, depending on the embodiment used, there are up to four possible situations for peripheral controller 200 to disambiguate: (1) a programmed EEPROM present, (2) a not programmed EEPROM present, (3) EEPDO to EEPDI loop-back coupling 704 present, and (4) EEPDI ground coupling 705 present. One manner of determining the situation that actually exists is as follows. The presence of serial EEPROM 203 is tentatively assumed, and a read of address 0 is communicated via serial EEPROM bus 206. EEPDI signal 703 is then monitored. If EEPDI ground coupling 705 is present, then EEPDI signal 703 will be zero during the read operation, even while the start bit and read opcode are transmitted to the EEPROM. If EEPDO to EEPDI loop-back coupling 704 is present, then EEPDI signal 703 will follow EEPDO signal 702, including the time during the start bit and read opcode transmission. If serial EEPROM 203 is present, however, then EEPDI signal 703 will not be driven during the time of transmission of the start bit and the read opcode.

If the EEPROM is found to be present, the data returned from serial EEPROM 203 by the read of address 0 determines whether the EEPROM is programmed or not. If the data is all ones, then the EEPROM is assumed to be not programmed (a one is read out from a bit-cell which is not programmed). These activities are performed within peripheral controller 200 by control logic 400 via serial EEPROM interface 405.

Those of ordinary skill in the art will recognize there are many other equally effective ways to determine if an external EEPROM is present, to determine if an external EEPROM is programmed, or to determine the nature of the I/O-pin configuration (and thus its corresponding secondary indicator state) if the EEPROM is absent. Thus, the above described illustrative techniques in no way limit the present invention.

Host EEPROM Programming Interface

The present invention includes the capability to program an external EEPROM under the direction of the host (see the earlier discussion of task 514 in FIG. 3). Peripheral controller 200 provides this capability via a register-level interface for host 201 to directly control and observe serial EEPROM bus 206. Peripheral controller 200 does not contain any stand-alone capability to program serial EEPROM 203 by itself. Instead, software executing on host 201 is required to write values at appropriate times to the register-level interface to produce the appropriate timing waveforms for the serial EEPROM interface signals. Typically host card specific driver layer 323 would provide functions for the conversion of higher level commands (read, program, and erase) to the required waveforms. These functions would then be accessed by host application 321 to provide an overall capability to the user to program (or re-program) any portion of serial EEPROM 203. This processing is included in procedure 507B of FIG. 3. The processing in peripheral controller 200 to pass these host register writes through to serial EEPROM 203 is included in procedure 511B. The details of the register-level interface provided in peripheral controller 200 are described below.

Control logic 400 of FIG. 2 includes P1 CR interface register 800 and EECR interface register 802. These registers provide host access to the serial EEPROM 203 via the peripheral controller, in accordance with the present invention. This register-level interface provides the host with direct read/write capability of the bits in the EEPROM serial communication bus, which in turn allows the host full access to the EEPROM (read, program, and erase commands).

P1CR interface register 800 includes a single bit, UNPROG bit 801. This read-only bit is asserted at the completion of procedure 601 of FIG. 4, when no external programmed EEPROM is detected (path 606), either because there is no external EEPROM, or there is an external EEPROM but it is not programmed. EECR interface register 802 includes four bits associated with serial EEPROM programming: EEPSEL bit 806, EEPCLK bit 805, EEPDO bit 804, and EEPDI bit 803. The first three bits (EEPSEL bit 806, EEPCLK bit 805, and EEPDO bit 804) are written by host 201 and then copied by serial EEPROM interface 405, in pass-through mode, onto the identically named bits of serial EEPROM bus 206 (EEPSEL signal 700, EEPCLK signal 701, and EEPDO signal 702, respectively), and thereby coupled to the appropriate inputs of serial EEPROM 203. Reading EECR interface register 802 returns the last value written into these three bits. The fourth bit, EEPDI bit 803, is copied by serial EEPROM interface 405, in pass-through mode, from EEPDI signal 703, and is read by host 201, to determine the value of the serial data output of serial EEPROM 203. EEPDI bit 803 is a read-only bit from the perspective of host 201. EECR interface register 802 may be used by host 201 to read, write, erase, or perform any other operation available via serial EEPROM bus 206, by appropriate host generated clocking, chip selection, opcode, data, and addressing information.

CONCLUSION

Although the present invention has been described using particular illustrative embodiments, it will be understood that many variations in construction, arrangement and use are possible consistent with the teachings and within the scope of the invention. For example, interconnect and function-unit bit-widths, clock speeds, and the type of technology used may generally be varied in each component block of the invention. Also, unless specifically stated to the contrary, the value ranges specified, the maximum and minimum values used, or other particular specifications (such as the host hardware or software, card form factor or protocol, internal memory technology, or external EEPROM organization), are merely those of the illustrative embodiments, can be expected to track improvements and changes in implementation technology, and should not be construed as limitations of the invention.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations within the scope of the invention include, but are not limited to: the host software (including operating system), host expansion card bus protocol and electrical signaling, peripheral controller control logic, and serial EEPROM bus.

All such variations in design comprise insubstantial changes over the teachings conveyed by the illustrative embodiments. The names given to interconnect and logic are illustrative, and should not be construed as limiting the invention. It is also understood that the invention has broad applicability to other computing applications, and is not limited to the particular application or industry of the illustrated embodiments. The present invention is thus to be construed as including all possible modifications and variations encompassed within the scope of the appended claims.

What is claimed is:

1. A peripheral controller for coupling a peripheral to a host computing device, and for use with an optional external memory, the peripheral controller comprising:
    a host interface implementing an expansion bus protocol compatible with the host computing device;
    a memory interface implementing a memory bus protocol compatible with the external memory;
    a host-visible memory configured to store operational CIS data;
    an internal initialization memory having default CIS data;
    control logic coupled to the host interface, the memory interface, the host-visible memory, and the internal initialization memory;
    wherein if the control logic determines that the external memory is absent or blank, then the host-visible memory is initialized at least in part from the internal initialization memory;
    wherein if the control logic determines that the external memory is present and programmed then the host-visible memory is initialized at least in part from the external memory; and
    wherein the host-visible memory is initialized at least in part to include control logic generated external memory pre-initialization-status information.

2. A peripheral controller as in claim 1 further wherein: subsequent to the at least partial initialization of the host-visible memory from the internal initialization memory, the peripheral controller being capable of provisional operation prior to having finalized operational CIS values, the provisional operation having programmer visible behavior compatible with host-based default card services and socket software and being responsive to host commands to selectively store finalized operational CIS values in at least one of the host-visible memory and the optional external memory.

3. A peripheral controller as in claim 1 further wherein: subsequent to the at least partial initialization of the host visible memory, the CIS data at least temporarily includes a Device-Information Tuple having a value determined at initialization to accurately convey one of a plurality of pre-initialization status conditions including the mutually exclusive conditions that the optional external memory is: missing, present and blank, and present and programmed.

4. A peripheral controller as in claim 3 further wherein: regardless of the pre-initialization status of the optional external memory and subsequent to the at least partial initialization of the host-visible memory, the peripheral controller exhibiting programmer visible behavior compatible with host-based default card services and socket software including the determination of a Plug and Play ID, the Plug and Play ID reflecting the pre-initialization status of the optional external memory conveyed by the Device-Information Tuple; and
subsequent to the host determining the Plug and Play ID and thereby the pre-initialization status of the optional external memory, the peripheral controller being responsive to host commands to selectively store finalized operational CIS values in at least one of the host-visible memory and the optional external memory.

5. A peripheral controller as in claim 1 further wherein: when the optional external memory is absent prior to initialization, a Device-Information Tuple is at least temporarily initialized in the host visible memory according to the default CIS data of the internal initialization memory;
when the optional external memory is present and blank prior to initialization, the Device-Information Tuple is at least temporarily initialized in the host visible memory to a one-bit modified derivative of the value used when the optional external memory is absent; and
when the optional external memory is present and programmed prior to initialization, the Device-Information Tuple is at least temporarily initialized in the host visible memory according to the CIS data of the optional external memory.

6. A peripheral controller as in claim 5 further wherein: regardless of the pre-initialization status of the optional external memory and subsequent to the at least partial initialization of the host-visible memory, the peripheral controller exhibiting programmer visible behavior compatible with host-based default card services and socket software including the determination of a Plug and Play ID, the Plug and Play ID reflecting the pre-initialization status of the optional external memory conveyed by the Device-Information Tuple; and
subsequent to the host determining the Plug and Play ID and thereby the pre-initialization status of the optional external memory, the peripheral controller being responsive to host commands to selectively store finalized operational CIS values in at least one of the host-visible memory and the optional external memory.

7. A peripheral controller as in claim 1 further wherein: the external memory pre-initialization status information at least conveys a control logic dynamically determined one of a predetermined plurality of possible mutually exclusive pre-initialization external memory conditions including programmed and blank.

8. A peripheral controller as in claim 7 further wherein: the external memory pre-initialization status information is at least temporarily conveyed within a Device-Information Tuple of the CIS data.

9. A peripheral controller as in claim 8 further wherein: the external memory pre-initialization status information is at least temporarily conveyed within a Device Information Byte of the CIS data.

10. A peripheral controller as in claim 7 further wherein: the predetermined plurality of possible mutually exclusive pre-initialization external memory conditions further includes absent.

11. A method for deferring the final programming of expansion module tuple space in an expansion module for a host, the expansion module optionally having a reprogrammable non-volatile memory, the method comprising:
    providing the host and the expansion module, the expansion module including a peripheral controller and optionally the reprogrammable non-volatile memory, the peripheral controller having a host-visible memory and an internal initialization memory including internal tuples;

coupling the expansion module to the host for the first time;

in the peripheral controller, determining the status of the reprogrammable non-volatile memory;

in the peripheral controller, if the reprogrammable non-volatile memory is absent or blank, initializing provisional operational tuples in the host-visible memory at least in part from the internal initialization memory;

in the peripheral controller, if the reprogrammable non-volatile memory is present and programmed, initializing operational tuples in the host-visible memory at least in part from the reprogrammable non-volatile memory;

in the peripheral controller, conveying the pre-initialization status of the reprogrammable non-volatile memory via the value of at least one of the operational tuples initialized in the host-visible memory;

the expansion module providing at least basic functionality to the host;

using host-based software to access the operational tuples initialized in the host-visible memory and determine the pre-initialization status of the reprogrammable non-volatile memory;

in the host, selecting whether or not to update the operational tuples initialized in the host-visible memory;

if updating is selected, the host commanding the peripheral controller to selectively store finalized operational tuples in at least one of the host-visible memory and the optional reprogrammable non-volatile memory; and whereby the reprogrammable non-volatile memory need not be present or pre-programmed prior to the first use of the expansion module.

12. The method as in claim 11, wherein the non-volatile memory includes EEPROM memory.

13. The method as in claim 11, wherein the non-volatile memory includes fuse programmable memory.

14. The method as in claim 11, wherein the non-volatile memory includes mask programmable memory.

15. The method as in claim 11, wherein the expansion module is a 32-bit PC Card.

16. The method as in claim 11, wherein the expansion module is a 16-bit PC Card.

17. The method as in claim 11, wherein the expansion module is a CompactFlash Card.

18. The method as in claim 11, wherein the host is a portable computing device.

19. The method as in claim 11, wherein the host is a PDA.

20. The method as in claim 11, wherein the host is a pocket computer.

21. The method as in claim 11, wherein the host is a notebook computer.

22. A method of performing tuple provisioning in a peripheral controller of an expansion module for a host, the method comprising:

in the peripheral controller, determining a pre-initialization status of a reprogrammable non-volatile memory including distinguishing between three mutually exclusive states:
a) absent,
b) blank, and
c) programmed;

in the peripheral controller, initializing a host-visible memory with operational tuples at least in part as a function of the pre-initialization status of the reprogrammable non-volatile memory, the initialization at least in part copying previously finalized tuples when available from the reprogrammable non-volatile memory and otherwise at least in part copying default tuples from an internal initialization memory, the initialization conveying the pre-initialization status of the reprogrammable non-volatile memory via the value of at least one of the operational tuples in the host-visible memory;

using host-based software to access the operational tuples in the host-visible memory and based thereon selecting whether or not to update at least some of the operational tuples in the host-visible memory; and if updating is selected, the host commanding the peripheral controller to selectively store the updated operational tuples in at least one of the host-visible memory and the reprogrammable non-volatile memory.

23. A method as in claim 22, further including:

in the peripheral controller, if the reprogrammable non-volatile memory is programmed, initializing the host-visible memory at least in part using the previously finalized tuples;

in the peripheral controller, if the reprogrammable non-volatile memory is blank, initializing the host-visible memory at least in part using the default tuples; and in the peripheral controller, if the reprogrammable non-volatile memory is absent, initializing the host-visible memory at least in part using the default tuples.

24. A method as in claim 22, further including:

in the peripheral controller, if the reprogrammable non-volatile memory is programmed, initializing the host-visible memory at least in part using the previously finalized tuples;

in the peripheral controller, if the reprogrammable non-volatile memory is blank, initializing the host-visible memory at least in part using the default tuples; and in the peripheral controller, if the reprogrammable non-volatile memory is absent, initializing the host-visible memory at least in part to indicate no tuples.

* * * * *